US008589323B2

(12) United States Patent (10) Patent No.: US 8,589,323 B2
Keith, Jr. (45) Date of Patent: *Nov. 19, 2013

(54) COMPUTER HARDWARE AND SOFTWARE DIAGNOSTIC AND REPORT SYSTEM INCORPORATING AN EXPERT SYSTEM AND AGENTS

(75) Inventor: Robert O. Keith, Jr., Modesto, CA (US)

(73) Assignee: Maxsp Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/074,986

(22) Filed: Mar. 5, 2008

(65) Prior Publication Data

US 2013/0204821 A1 Aug. 8, 2013

Related U.S. Application Data

(63) Continuation-in-part of application No. 11/440,563, filed on May 24, 2006, now Pat. No. 8,234,238, which is a continuation-in-part of application No. 11/368,214, filed on Mar. 2, 2006, now Pat. No. 7,512,584.

(60) Provisional application No. 60/658,970, filed on Mar. 4, 2005.

(51) Int. Cl.
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| 4,866,635 A | * | 9/1989 | Kahn et al. ............... 706/46 |
| 5,602,990 A | * | 2/1997 | Leete ....................... 714/46 |
| 5,649,196 A | | 7/1997 | Woodhill et al. .......... 395/620 |

(Continued)

FOREIGN PATENT DOCUMENTS

| WO | WO2005119493 A2 | 12/2005 |
| WO | WO2005119494 A2 | 12/2005 |

(Continued)

OTHER PUBLICATIONS

"Microsoft Computer Dictionary, Fifth Edition", 2002, 3 pages.*

(Continued)

*Primary Examiner* — Kakali Chaki
*Assistant Examiner* — Mai T Tran
(74) *Attorney, Agent, or Firm* — Haverstock & Owens LLP

(57) ABSTRACT

The diagnostic and report system tests computer systems for defects that are able to cause performance and functional problems. An agent application is first installed on a user's system. The agent application then retrieves problem data from the expert system library pertinent to the user's operating environment. The agent application tests the user's system for each problem description within a downloaded data structure from the expert system library. If a problem is discovered, a script attempts to remediate the problem and/or notifies the user, describing the issue. The agent application utilizes discrete programs and/or scripts to send data to a knowledge base so that the knowledge base is able to generate new discrete programs and/or scripts using artificial intelligence which are sent to the expert system library. With additional discrete programs and/or scripts, the user's system is better protected.

25 Claims, 8 Drawing Sheets

(56) References Cited

U.S. PATENT DOCUMENTS

| | | | |
|---|---|---|---|
| 5,659,743 A | 8/1997 | Adams et al. ............... 395/621 |
| 5,787,409 A | 7/1998 | Seiffert et al. |
| 5,802,364 A | 9/1998 | Senator et al. |
| 5,812,751 A | 9/1998 | Ekrot et al. |
| 5,835,911 A | 11/1998 | Nakagawa et al. |
| 5,897,635 A | 4/1999 | Torres et al. |
| 5,933,647 A | 8/1999 | Aronberg et al. |
| 5,950,010 A | 9/1999 | Hesse et al. |
| 5,974,547 A | 10/1999 | Klimenko ..................... 713/2 |
| 6,012,152 A * | 1/2000 | Douik et al. ................. 714/26 |
| 6,029,196 A | 2/2000 | Lenz ............................ 709/221 |
| 6,067,582 A | 5/2000 | Smith et al. |
| 6,144,959 A | 11/2000 | Anderson et al. |
| 6,170,065 B1 * | 1/2001 | Kobata et al. ................ 714/7 |
| 6,189,101 B1 | 2/2001 | Dusenbury, Jr. |
| 6,209,089 B1 | 3/2001 | Selitrennikoff et al. ........ 713/2 |
| 6,212,660 B1 | 4/2001 | Joeressen et al. ............ 714/758 |
| 6,282,711 B1 | 8/2001 | Halpern et al. |
| 6,292,827 B1 | 9/2001 | Raz .............................. 709/217 |
| 6,301,612 B1 | 10/2001 | Selitrennikoff et al. ....... 709/220 |
| 6,311,221 B1 | 10/2001 | Raz et al. .................... 709/231 |
| 6,314,428 B1 | 11/2001 | Brew et al. |
| 6,317,761 B1 | 11/2001 | Landsman et al. ........... 707/513 |
| 6,349,137 B1 | 2/2002 | Hunt et al. |
| 6,356,915 B1 | 3/2002 | Chtchetkine et al. ........ 707/200 |
| 6,363,400 B1 | 3/2002 | Chtchetkine et al. ........ 707/200 |
| 6,366,296 B1 | 4/2002 | Boreczky et al. ............ 345/719 |
| 6,378,035 B1 | 4/2002 | Parry et al. .................. 711/110 |
| 6,421,777 B1 | 7/2002 | Pierre-Louis et al. ........... 713/2 |
| 6,449,658 B1 | 9/2002 | Lafe et al. ................... 709/247 |
| 6,459,499 B1 | 10/2002 | Tomat |
| 6,463,530 B1 | 10/2002 | Sposato ........................ 713/2 |
| 6,473,794 B1 | 10/2002 | Guheen et al. ............... 709/223 |
| 6,477,531 B1 * | 11/2002 | Sullivan et al. ............... 707/10 |
| 6,490,677 B1 | 12/2002 | Aquilar et al. ................ 713/1 |
| 6,536,037 B1 | 3/2003 | Guheen et al. ............... 717/151 |
| 6,553,375 B1 | 4/2003 | Huang et al. |
| 6,556,950 B1 | 4/2003 | Schwenke et al. ........... 702/183 |
| 6,574,618 B2 | 6/2003 | Eylon et al. .................. 707/1 |
| 6,606,744 B1 | 8/2003 | Mikurak ....................... 717/174 |
| 6,625,651 B1 | 9/2003 | Swartz et al. |
| 6,625,754 B1 | 9/2003 | Aguilar et al. |
| 6,633,782 B1 * | 10/2003 | Schleiss et al. ............... 700/26 |
| 6,636,857 B2 | 10/2003 | Thomas et al. ............... 707/10 |
| 6,654,797 B1 | 11/2003 | Kamper ........................ 709/220 |
| 6,654,801 B2 | 11/2003 | Mann et al. |
| 6,694,375 B1 | 2/2004 | Beddus et al. ............... 709/249 |
| 6,697,852 B1 | 2/2004 | Ryu |
| 6,704,886 B1 | 3/2004 | Gill et al. |
| 6,718,464 B2 | 4/2004 | Cromer et al. ................. 713/2 |
| 6,728,530 B1 | 4/2004 | Heinonen et al. |
| 6,735,625 B1 | 5/2004 | Ponna ........................... 709/223 |
| 6,751,658 B1 | 6/2004 | Haun et al. ................... 709/222 |
| 6,757,729 B1 | 6/2004 | Devarakonda et al. |
| 6,757,894 B2 | 6/2004 | Eylon et al. .................. 717/177 |
| 6,816,462 B1 | 11/2004 | Booth, III et al. ........... 370/248 |
| 6,816,882 B1 | 11/2004 | Conner et al. |
| 6,820,180 B2 | 11/2004 | McBrearty et al. |
| 6,871,210 B1 | 3/2005 | Subramanian ................ 709/203 |
| 6,880,108 B1 | 4/2005 | Gusler et al. |
| 6,885,481 B1 | 4/2005 | Dawe |
| 6,886,020 B1 | 4/2005 | Zahavi et al. ................ 707/204 |
| 6,915,343 B1 * | 7/2005 | Brewer et al. ................ 709/224 |
| 6,954,853 B2 | 10/2005 | Wang et al. |
| 6,954,930 B2 | 10/2005 | Drake et al. .................. 717/178 |
| 6,959,235 B1 | 10/2005 | Abdel-Malek et al. |
| 6,985,967 B1 | 1/2006 | Hipp |
| 7,003,560 B1 | 2/2006 | Mullen et al. |
| 7,003,663 B2 | 2/2006 | Lagosanto et al. |
| 7,024,471 B2 | 4/2006 | George et al. |
| 7,058,698 B2 | 6/2006 | Chatterjee et al. |
| 7,080,118 B2 | 7/2006 | Hildebrand |
| 7,143,307 B1 | 11/2006 | Witte et al. |
| 7,149,698 B2 | 12/2006 | Guheen et al. |
| 7,175,078 B2 | 2/2007 | Ban et al. |
| 7,178,166 B1 | 2/2007 | Taylor et al. |
| 7,194,445 B2 * | 3/2007 | Chan et al. ................... 706/20 |
| 7,200,779 B1 * | 4/2007 | Coss et al. .................... 714/48 |
| 7,210,143 B2 | 4/2007 | Or et al. ....................... 717/174 |
| 7,237,122 B2 | 6/2007 | Kadam et al. |
| 7,260,597 B1 | 8/2007 | Hofrichter et al. |
| 7,287,053 B2 | 10/2007 | Bodin |
| 7,328,367 B2 | 2/2008 | Ukai et al. |
| 7,337,311 B2 | 2/2008 | Chen et al. |
| 7,392,046 B2 * | 6/2008 | Leib et al. .................... 455/423 |
| 7,401,125 B1 | 7/2008 | Uchida et al. |
| 7,480,822 B1 | 1/2009 | Arbon et al. |
| 7,487,383 B2 | 2/2009 | Bensinger |
| 7,512,584 B2 | 3/2009 | Keith, Jr. |
| 7,571,467 B1 | 8/2009 | Priestley et al. |
| 7,624,086 B2 | 11/2009 | Keith, Jr. |
| 7,627,694 B2 | 12/2009 | Sreenivasan et al. |
| 7,664,834 B2 | 2/2010 | Keith, Jr. |
| 7,698,487 B2 | 4/2010 | Rothman et al. |
| 7,788,524 B2 | 8/2010 | Wing et al. |
| 7,840,514 B2 | 11/2010 | Keith, Jr. |
| 7,844,686 B1 | 11/2010 | Keith, Jr. |
| 7,908,339 B2 | 3/2011 | Keith, Jr. |
| 8,099,378 B2 | 1/2012 | Keith, Jr. |
| 8,175,418 B1 | 5/2012 | Keith, Jr. |
| 8,234,238 B2 | 7/2012 | Keith, Jr. |
| 8,307,239 B1 | 11/2012 | Keith, Jr. |
| 2001/0034736 A1 | 10/2001 | Eylon et al. .................. 707/200 |
| 2001/0037323 A1 | 11/2001 | Moulton et al. ............. 707/1 |
| 2001/0037399 A1 | 11/2001 | Eylon et al. .................. 709/231 |
| 2001/0037400 A1 | 11/2001 | Raz et al. ..................... 709/232 |
| 2001/0044850 A1 | 11/2001 | Raz et al. ..................... 709/231 |
| 2001/0049793 A1 | 12/2001 | Sugimoto ..................... 713/200 |
| 2002/0007418 A1 | 1/2002 | Hegde et al. ................. 709/231 |
| 2002/0013827 A1 | 1/2002 | Edstrom et al. |
| 2002/0035674 A1 | 3/2002 | Vetrivelkumaran et al. |
| 2002/0042833 A1 | 4/2002 | Hendler et al. ............... 709/231 |
| 2002/0049764 A1 | 4/2002 | Boothby et al. .............. 707/100 |
| 2002/0083183 A1 | 6/2002 | Pujare et al. ................. 709/231 |
| 2002/0087625 A1 | 7/2002 | Toll et al. |
| 2002/0087717 A1 | 7/2002 | Artzi et al. ................... 709/236 |
| 2002/0087883 A1 | 7/2002 | Wohlgemuth et al. ........ 713/201 |
| 2002/0087963 A1 | 7/2002 | Eylon et al. .................. 717/174 |
| 2002/0091763 A1 | 7/2002 | Shah et al. ................... 709/203 |
| 2002/0094868 A1 | 7/2002 | Tuck et al. |
| 2002/0104080 A1 | 8/2002 | Woodard et al. |
| 2002/0107920 A1 | 8/2002 | Hotti |
| 2002/0107945 A1 | 8/2002 | George et al. |
| 2002/0116585 A1 | 8/2002 | Scherr .......................... 711/133 |
| 2002/0124092 A1 | 9/2002 | Urien ........................... 709/229 |
| 2002/0129089 A1 | 9/2002 | Hegde et al. ................. 709/200 |
| 2002/0138640 A1 | 9/2002 | Raz et al. ..................... 709/231 |
| 2002/0157089 A1 | 10/2002 | Patel et al. ................... 717/178 |
| 2002/0161868 A1 | 10/2002 | Paul et al. .................... 709/221 |
| 2002/0161908 A1 | 10/2002 | Benitez et al. ............... 709/231 |
| 2002/0169797 A1 | 11/2002 | Hegde et al. ................. 707/500.1 |
| 2002/0188941 A1 | 12/2002 | Cicciarelli et al. ........... 717/175 |
| 2003/0004882 A1 | 1/2003 | Holler et al. ................. 705/51 |
| 2003/0005096 A1 | 1/2003 | Paul et al. .................... 709/22 |
| 2003/0009538 A1 | 1/2003 | Shah et al. ................... 709/219 |
| 2003/0033379 A1 | 2/2003 | Civanlar et al. .............. 709/218 |
| 2003/0036882 A1 | 2/2003 | Harper et al. |
| 2003/0037328 A1 | 2/2003 | Cicciarelli et al. |
| 2003/0041136 A1 | 2/2003 | Cheline et al. ............... 709/223 |
| 2003/0046371 A1 | 3/2003 | Falkner |
| 2003/0051128 A1 | 3/2003 | Rodriguez et al. ........... 713/100 |
| 2003/0055825 A1 | 3/2003 | Fletcher et al. |
| 2003/0078960 A1 | 4/2003 | Murren et al. |
| 2003/0110188 A1 | 6/2003 | Howard et al. |
| 2003/0126242 A1 | 7/2003 | Chang .......................... 709/222 |
| 2003/0140160 A1 | 7/2003 | Raz et al. ..................... 709/231 |
| 2003/0191730 A1 | 10/2003 | Adkins et al. ................ 706/47 |
| 2003/0204562 A1 | 10/2003 | Hwang |
| 2003/0233383 A1 | 12/2003 | Koskimies |
| 2003/0233493 A1 | 12/2003 | Boldon et al. |
| 2004/0010716 A1 | 1/2004 | Childress et al. |
| 2004/0068554 A1 | 4/2004 | Bales et al. |
| 2004/0073787 A1 | 4/2004 | Ban et al. |
| 2004/0093492 A1 | 5/2004 | Daude et al. ................. 713/156 |

(56) References Cited

U.S. PATENT DOCUMENTS

| | | | |
|---|---|---|---|
| 2004/0104927 A1 | 6/2004 | Husain et al. | 345/733 |
| 2004/0107273 A1 | 6/2004 | Biran et al. | |
| 2004/0123153 A1 | 6/2004 | Wright et al. | 713/201 |
| 2004/0128346 A1 | 7/2004 | Melamed et al. | 709/203 |
| 2004/0148306 A1 | 7/2004 | Moulton et al. | 707/101 |
| 2004/0180721 A1 | 9/2004 | Rowe | |
| 2004/0193876 A1 | 9/2004 | Donley et al. | |
| 2004/0201604 A1 | 10/2004 | Kraenzel et al. | 345/700 |
| 2004/0236843 A1* | 11/2004 | Wing et al. | 709/219 |
| 2004/0243928 A1 | 12/2004 | Hesmer et al. | |
| 2005/0027846 A1 | 2/2005 | Wolfe et al. | 709/223 |
| 2005/0033808 A1 | 2/2005 | Cheng et al. | |
| 2005/0044197 A1 | 2/2005 | Lai | |
| 2005/0044544 A1 | 2/2005 | Slivka et al. | 717/174 |
| 2005/0060281 A1 | 3/2005 | Bucher et al. | |
| 2005/0108297 A1 | 5/2005 | Rollin et al. | |
| 2005/0108546 A1 | 5/2005 | Lehew et al. | |
| 2005/0108593 A1 | 5/2005 | Purushothaman et al. | |
| 2005/0144218 A1* | 6/2005 | Heintz | 709/202 |
| 2005/0149729 A1 | 7/2005 | Zimmer et al. | 713/168 |
| 2005/0160289 A1 | 7/2005 | Shay | |
| 2005/0193245 A1 | 9/2005 | Hayden et al. | |
| 2005/0198196 A1 | 9/2005 | Bohn et al. | |
| 2005/0216524 A1 | 9/2005 | Gomes et al. | |
| 2005/0216902 A1 | 9/2005 | Schaefer | |
| 2005/0226059 A1 | 10/2005 | Kavuri et al. | |
| 2005/0256952 A1 | 11/2005 | Mouhanna et al. | |
| 2005/0262503 A1 | 11/2005 | Kane | |
| 2005/0268145 A1 | 12/2005 | Hufferd et al. | |
| 2005/0273486 A1 | 12/2005 | Keith, Jr. | 709/200 |
| 2005/0283606 A1 | 12/2005 | Williams | 713/166 |
| 2005/0286435 A1 | 12/2005 | Ogawa et al. | |
| 2006/0021040 A1 | 1/2006 | Boulanger et al. | 726/23 |
| 2006/0031377 A1 | 2/2006 | Ng et al. | |
| 2006/0031407 A1 | 2/2006 | Dispensa et al. | |
| 2006/0031529 A1 | 2/2006 | Keith, Jr. | 709/227 |
| 2006/0041641 A1 | 2/2006 | Breiter et al. | |
| 2006/0041759 A1 | 2/2006 | Kaliski, Jr. et al. | |
| 2006/0047716 A1 | 3/2006 | Keith, Jr. | 707/203 |
| 2006/0047946 A1 | 3/2006 | Keith, Jr. | 713/2 |
| 2006/0074943 A1 | 4/2006 | Nakano et al. | |
| 2006/0095705 A1 | 5/2006 | Wichelman et al. | 711/171 |
| 2006/0129459 A1 | 6/2006 | Mendelsohn | |
| 2006/0143709 A1 | 6/2006 | Brooks et al. | 726/23 |
| 2006/0149955 A1 | 7/2006 | Velhal et al. | |
| 2006/0179061 A1 | 8/2006 | D'Souza et al. | |
| 2006/0224544 A1 | 10/2006 | Keith, Jr. | 706/60 |
| 2006/0224545 A1 | 10/2006 | Keith, Jr. | 706/60 |
| 2006/0233310 A1 | 10/2006 | Adams, Jr. et al. | |
| 2007/0078982 A1 | 4/2007 | Aidun et al. | |
| 2007/0094269 A1 | 4/2007 | Mikesell et al. | |
| 2007/0143374 A1 | 6/2007 | D'Souza et al. | |
| 2007/0174658 A1 | 7/2007 | Takamoto et al. | |
| 2007/0174690 A1 | 7/2007 | Kambara et al. | |
| 2007/0185936 A1 | 8/2007 | Derk et al. | |
| 2007/0233633 A1 | 10/2007 | Keith, Jr. | 706/60 |
| 2007/0239905 A1 | 10/2007 | Banerjee et al. | 710/22 |
| 2007/0271290 A1 | 11/2007 | Keith, Jr. | 707/101 |
| 2007/0271428 A1 | 11/2007 | Atluri | |
| 2007/0274315 A1 | 11/2007 | Keith | 370/392 |
| 2007/0276836 A1 | 11/2007 | Chatterjee et al. | |
| 2008/0016387 A1 | 1/2008 | Bensinger | |
| 2008/0034019 A1 | 2/2008 | Cisler et al. | |
| 2008/0034071 A1 | 2/2008 | Wilkinson et al. | |
| 2008/0077622 A1 | 3/2008 | Keith | 707/200 |
| 2008/0077630 A1 | 3/2008 | Keith, Jr. | |
| 2008/0127294 A1 | 5/2008 | Keith | 726/1 |
| 2008/0209142 A1 | 8/2008 | Obernuefemann | |
| 2008/0216168 A1 | 9/2008 | Larson et al. | |
| 2008/0294860 A1 | 11/2008 | Stakutis et al. | |
| 2008/0313632 A1 | 12/2008 | Kumar et al. | |
| 2009/0094362 A1 | 4/2009 | Huff | |
| 2010/0050011 A1 | 2/2010 | Takamoto et al. | |
| 2010/0125770 A1 | 5/2010 | Keith, Jr. | |
| 2011/0047118 A1 | 2/2011 | Keith, Jr. | |
| 2012/0198154 A1 | 8/2012 | Keith, Jr. | |
| 2012/0272099 A1 | 10/2012 | Keith, Jr. | |
| 2013/0031405 A1 | 1/2013 | Keith, Jr. | |

FOREIGN PATENT DOCUMENTS

| | | |
|---|---|---|
| WO | WO2005119495 A2 | 12/2005 |
| WO | WO2006010131 A2 | 1/2006 |
| WO | WO2006094282 A2 | 9/2006 |
| WO | WO2006094301 A2 | 9/2006 |
| WO | WO2007139962 A2 | 12/2007 |
| WO | WO2007139963 A2 | 12/2007 |
| WO | WO2008039386 A2 | 4/2008 |
| WO | WO2008039394 A2 | 4/2008 |
| WO | WO2008039395 A2 | 4/2008 |

OTHER PUBLICATIONS

Definition of background processing, IEEE 100, The Authoritative Dictionary of IEEE Standards Terms, 7$^{th}$ Edition, 2000, 3 pages.*
IEEE100 The Authoritative Dictionary of IEEE Standards Terms, Seventh Edition, Jan. 2003, 3 pages.
VMware, VMware Infrastructure Architecture Overview, Jun. 14, 2006, http:/www.vmware.com/resourse/techresources/, pp. 1-14.
VMware, Using VMware Infrastructure for Backup and Restore, Oct. 26, 2006, http:/www.vmware.com/resourse/techresources/, pp. 1-20.
IBM Corporation, AFS: "User Guide", First Edition, Version 3.6. Apr. 2000, pp. 112.
Shepler et al. "RFC 3530—Network File System (NFS) version 4 Protocol", Standards Track, Apr. 2003, pp. 278, http://tools.ietf.org/html/rfc3530#page-119.
Microsoft@ Computer Dictionary, Fifth Edition, 2002, 3 pages.
Tridgell, A., "Efficient Algorithms for Sorting and Synchronization," Thesis, The Australian National University, Feb. 1999, 106 pages.
MacDonald, J.P., "File System Support for Delta Compression," University of California at Berkeley, Dept. of Electrical Engineering and Computer Sciences, May 19, 2000, 32 pages.
Yu et al., "Scalable network resource management for large scale Virtual Private Networks," Simulation Modeling Practice and Theory, 12 (2004) pp. 263-285.
Cisco PIX "Configuring an IPSec Tunnel Between a Cisco Secure PIX Firewall and a Checkpoint NG Firewall," May 12, 2006, document ID 23785.
Microsoft Press, Microsoft® Computer Dictionary, Fifth Edition, May 1, 2002, p. 39.
Muthitacharoen et al., "A Low-bandwidth Network File System," MIT Laboratory for Computer Science and NYU Department of Computer Science, 2001, 14 pages.
Random House Unabridged Dictionary, "device: meaning and definitions," 1997, Random House Inc., retrieved via "http://dictionary.infoplease.com/device".
Definition of Plug-in (computing) from http://en.wikipedia.org/wiki/Plug-in_(computing), printed on Jun. 18, 2011, 1 page.
Plug-in definition from Wikipedia, http://en.wikipedia.org/wiki/Plug-in_(computing) printed Nov. 6, 2011, 5 pages.

* cited by examiner

| ID | Class | Platform | Product | Description | Criteria  Test_ref | Remediation Description | Remediation Script |
|---|---|---|---|---|---|---|---|
| 302 | 304 | 306 | 308 | 310 | 313 ⌐ 312 | 314 | 316 |

```xml
<diag>
    <id>5</id>
    <version>1.0</version>
    <date_created>1.0</date_created>
    <date_modified>1.0</date_modified>
    <maxsp_url></maxsp_url>
    <order>3</order>
    <name>Ethernet card errors</name>
    <category>hardware</category>
    <family>Hardware Management</family>
    <repairable>no</repairable>
    <desc_language>English</desc_language>
    <desc>Your ethernet card is reporting errors. This may be due to faulty
        network card, cable or other hardware.
    <remediation>1. First, replace your ethernet cable or re-seat the
        cables. 2. You may need to replace the ethernet card.
    </remediation>
    <script_lang>max1</script_lang>
    <diag_script>
        let ethers = F$GETWMI('ethport1', 'counters')
        If (ethers > 0) then
            F$TMPSTOR('ethernet counters', ethers)
            Return 8
        endif
    </diag_script>
    <repair_script></repair_script>
    <platforms>Windows</platforms>
    <dependency></dependency>
    <confidence><confidence>
    <health_index></health_index>
</diag>
```

Fig. 4

COMPUTER HARDWARE AND SOFTWARE DIAGNOSTIC AND REPORT SYSTEM INCORPORATING AN EXPERT SYSTEM AND AGENTS

RELATED APPLICATIONS(S)

This application is a continuation-in-part of U.S. patent application Ser. No. 11/440,563, filed on May 24, 2006 now U.S. Pat. No. 8,234,238 and entitled "COMPUTER HARDWARE AND SOFTWARE DIAGNOSTIC AND REPORT SYSTEM" which is hereby incorporated by reference, and which is a continuation-in-part of U.S. patent application Ser. No. 11/368,214, filed on Mar. 2, 2006 now U.S. Pat. No. 7,512,584 and entitled "COMPUTER HARDWARE AND SOFTWARE DIAGNOSTIC AND REPORT SYSTEM" which is hereby incorporated by reference, and which claims priority under 35 U.S.C. §119(e) of the U.S. Provisional Patent Application, Ser. No. 60/658,970, filed Mar. 4, 2005, and entitled "PRE-INSTALL COMPLIANCE AND CENTRAL PROBLEM DISCOVERY SYSTEM." The Provisional Patent Application, Ser. No. 60/658,970, filed Mar. 4, 2005, and entitled "PRE-INSTALL COMPLIANCE AND CENTRAL PROBLEM DISCOVERY SYSTEM" is also hereby incorporated by reference in its entirety.

The following co-owned, co-filed, co-pending U.S. patent application, Ser. No. 11/368,212, filed Mar. 2, 2006 and entitled PRE-INSTALL COMPLIANCE SYSTEM is also incorporated by reference.

FIELD OF THE INVENTION

The present invention relates to the field of computer system maintenance. More specifically, the present invention relates to the field of testing computer systems for configuration problems and providing remediation solutions to the discovered problems.

BACKGROUND OF THE INVENTION

With the complexity and interoperability of software and hardware today, it is very difficult to install or remove one program without having an effect on one or more pre-existing programs. Microsoft® Windows® operating systems as well as other operating systems have a plethora of components that all must maintain their integrity, otherwise the operating system becomes unstable and possibly fails. Furthermore, generally when hardware is installed, software drivers which allow the hardware to communicate with the software must be installed as well. If these drivers are corrupted, the hardware will not function properly. Additionally, many software programs have components beyond a main executable file which allow the programs to communicate with the operating system, and if these components are deleted or modified incorrectly, the program will no longer function. All of these components, whether they be part of the operating system, hardware or other software, must be able to co-exist without harming each other. Specifically, when the system is modified in some way such as by installing or removing a piece of hardware or a software program, the system should do it so that everything still functions correctly. Furthermore, over time, modifications are made to the system such as updating drivers and installing patches, and these modifications may adversely affect other components of the system. Also, if a user neglects to update his system, he could leave the system open to attacks by viruses or other intruders. So either by action or inaction, a user's system has the potential for issues, and such issues should be monitored.

There are many products which monitor a system or attempt to repair components of the system, but they all have their shortcomings and do not provide the full package to adequately ensure a stable system environment.

Windows® registry repair programs such as Registry Mechanic™ developed by PC Tools™ aid a user in cleaning, repairing and optimizing the Windows® registry. Registry Mechanic™ uses a detection algorithm to scan a user's registry and identify missing and invalid references in a user's registry. Then a list is provided of the registry errors found, so that a user is able to selectively choose to clean each item or automatically repair all of them.

BMC Software and Computer Associates International develop performance software, but these software packages tend to be host based software products.

Other products like security vulnerability scanning software, spyware/virus scanners and patch management software assist in maintaining a stable computing environment. Very well known companies like McAfee and Symantec develop virus scanners to protect a user's computer from being harmed by viruses. Viruses are computer programs which have the ability to disrupt and damage a user's system. The products from these companies are able to scan a user's system and locate irregular programs that fit certain definitions stored in a database. Upon detecting a virus, a user is able to remove the problem and hopefully avoid harm to his computer system. STEALTHbits Technologies develops a program called stealthAUDIT for Exchange. The program is an agentless auditing and conformance management platform that enables users to identify changes in the system to avoid problems by performing discreet patch scanning. However, these products are very focused exclusively on their specific areas of technology such as virus checking or patch management and do not include an entire package for maintaining system stability.

There are significant problems with the aforementioned options. They are not necessarily end user friendly. They do not focus on overall user support or computer reliability. They are not Application Service Provider (ASP) friendly. Furthermore, they lack other significant features. Hence, a solution is needed to overcome these issues.

SUMMARY OF THE INVENTION

The diagnostic and report system tests computer systems for defects that are able to cause performance and functional problems. An agent application is first installed on a user's system. The agent application then retrieves problem data from the expert system library pertinent to the user's operating environment. The agent application tests the user's system for each problem description within a downloaded data structure from the expert system library. If a problem is discovered, a script attempts to remediate the problem and/or notifies the user, describing the issue. The agent application utilizes discrete programs and/or scripts to send data to a knowledge base so that the knowledge base is able to generate new discrete programs and/or scripts using artificial intelligence which are sent to the expert system library. With additional discrete programs and/or scripts, the user's system is better protected.

In one aspect, a system for monitoring a computing device comprises a plurality of programs for interacting with the computing device to gather information and a knowledge base coupled to the plurality of programs for receiving the information and generating a new program for interacting with the computing device. Interacting with the computing device further comprises determining a setup of the computing device, gathering information related to configuration of the computing device and analyzing the computing device. Interacting with the computing device further comprises resolving an issue within the computing device. The plurality of programs run in the background of the computing device. The system further comprises a feedback mechanism for sending feedback to the knowledge base. The plurality of programs are stored within an expert system library. The knowledge base expands the expert system library. In some embodiments, the expert system library is expanded by one or more of inference processing and pattern recognition. The system further comprises a reporting mechanism to report one or more problems. The plurality of programs are embedded within an extensible markup language (XML) structure. The computing device is selected from the group consisting of a/an personal computer, Apple computer, thin client, laptop, cell phone and PDA. Gathering information includes discovering one or more problems. The system further comprises a plurality of scripts for communicating with the plurality of programs. The knowledge base is for generating additional scripts for interacting with the computing device. In some embodiments, the new program is generated using a program model. In some embodiments, the new program is generated using a template. In some embodiments, a sensor agent monitors hardware characteristics and sends information to the knowledge base.

In another aspect, a system for monitoring a computing device while running in the background of the computing device comprises a plurality of programs for determining a setup of the computing device, gathering information related to configuration of the computing device and analyzing the computing device for one or more problems, a plurality of scripts coupled to the plurality of programs for initiating the plurality of programs and a knowledge base coupled to the plurality of programs for receiving the information and generating a new program and a script for interacting with the computing device. The plurality of programs and the plurality of scripts are stored within an expert system library. The system further comprises a feedback mechanism for sending feedback to the knowledge base. The knowledge base expands the expert system library. In some embodiments, the expert system library is expanded by one or more of inference processing and pattern recognition. The system further comprises a reporting mechanism to report the one or more problems. The plurality of programs and the plurality of scripts are embedded within an extensible markup language (XML) structure. The computing device is selected from the group consisting of a/an personal computer, Apple computer, thin client, laptop, cell phone and PDA. In some embodiments, the new program and script are generated using a program model. In some embodiments, the new program and script are generated using a template. In some embodiments, a sensor agent monitors hardware characteristics and sends information to the knowledge base.

In yet another aspect, a method of providing a stable computing device comprises collecting data, analyzing the data, generating a new program from the analyzed data, transferring the new program and utilizing the new program on the computing device. The data is collected by an existing program. Collecting data includes transferring the data to a knowledge base. Analyzing the data occurs within a knowledge base. Generating a new program from the analyzed data includes using a template to generate the new program. The new program contains characteristics based on the analyzed data. The new program is transferred to an expert system library. Utilizing the new program is selected from the group consisting of monitoring the computer system and repairing an issue within the computer system. An agent program utilizes the new program. The computing device is selected from the group consisting of a personal computer, an Apple computer, a thin client, a laptop, a cell phone and a PDA.

BRIEF DESCRIPTION OF THE DRAWINGS

FIG. 3 illustrates an example data structure for the expert system library.

FIG. 4 illustrates an example XML coded version of a data structure for the expert system library.

DETAILED DESCRIPTION OF THE PREFERRED EMBODIMENT

Figure 1:
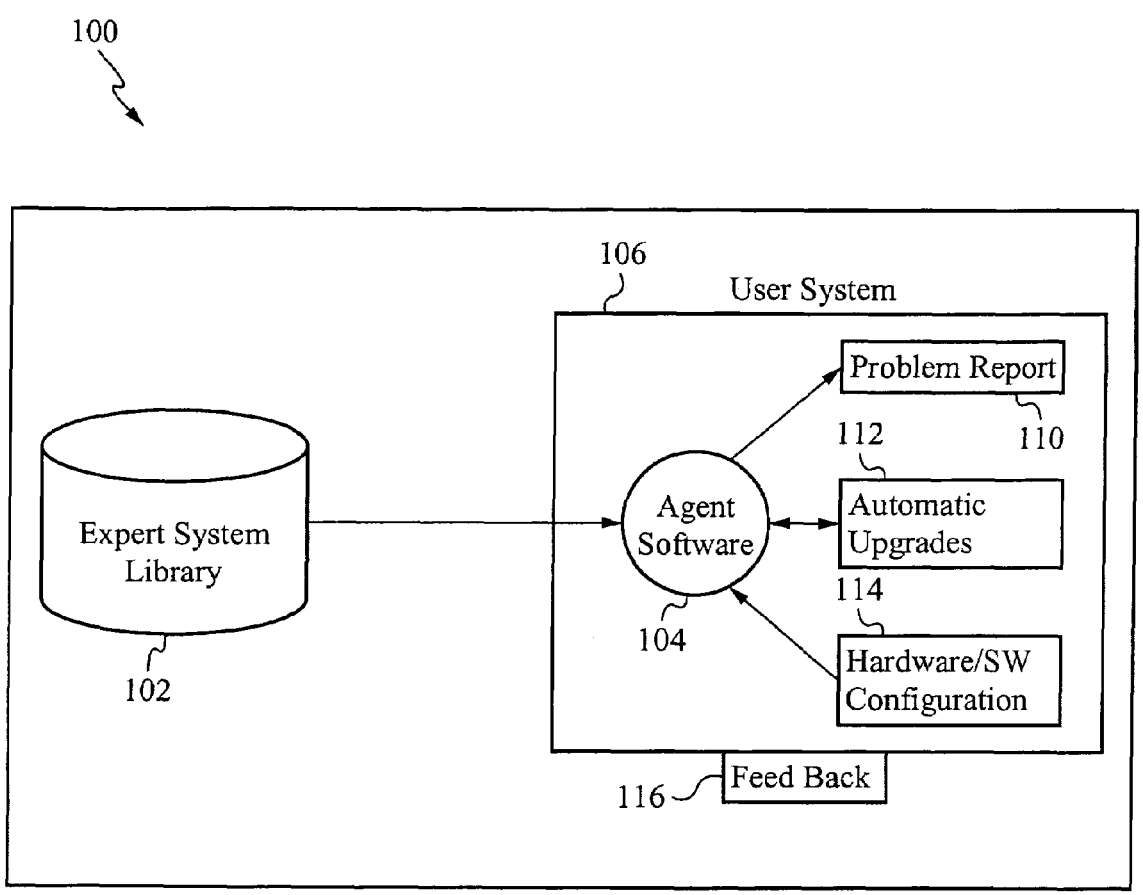
FIG. 1 illustrates a block diagram representation of the main components of an embodiment of the diagnostic and report system.

The diagnostic and report system is a system and method for using an expert system library of computer configuration problems to test individual computer systems for the existence of problems and then providing remediation solutions for each discovered problem. The system enables maintenance procedures and requirements for system competence to be centralized and distributed, providing an end user a solution to scan his system for configuration problems and to manually or automatically resolve these problems. Configuration problems include, but are not limited to, incomplete software package install and de-installs, incorrect Windows® registry values, software release and patch release issues, software driver problems, network configuration and connectivity, performance issues and many other problems.

The diagnostic and report system provides the ability to build a central expert system library repository with constructive input from multiple sources. The system is also able to support an application service provider (ASP) infrastructure and business enterprise applications. Furthermore, software applications have the ability to run disconnected from the central server and network. The system is scaleable so that it has the ability to support extremely large ASP user bases over disparate network topologies. The system supports subscription licenses, so that when the subscription is void or expired, the desktop software will be disabled and inactive. The system also supports disparate end-user hardware including Personal Computers (PCs), Apple PC's, thin clients, laptops, cell phones, PDA's and other mobile devices. The diagnostic and report system utilizes a plug-in model so that each entry in the expert system library is discrete, allowing multiple authors to add to the central repository independently.

The diagnostic and report system generally comprises four main components: a central compatibility expert system library, a host resident client interrogation agent, problem reporting and remediation mechanisms and a user support feedback mechanism.

Any of the many software and hardware configuration problems is able to be described discretely. Each problem, when stored in a format usable by software resident on an end-user's system, is able to be processed serially, meaning one problem at a time. In an alternative embodiment, problems are processed in parallel, meaning at the same time. The central expert system library stores the problem and resolution information. The information is able to be retrieved and communicated to end-user clients via a problem language and protocol. The information stored includes shared software module names and revisions, hardware driver prerequisites, hardware requirements, operating system revision levels and other operating environment prerequisites. The expert system library also contains software and hardware exceptions.

A plurality of discrete programs are utilized to address these problems. As knowledge grows, the library grows and thousands of discrete programs are developed. For example, initially the system knows how to problem solve internal issues related to CPUs, motherboards, hard disk drives, RAM, video cards, power supplies and software. However, as information is discovered related to other components, the expert system library is able to grow and trouble shoot those areas as well. These other components include for example, networking components such as network cards, cables and routers and peripheral devices such as printers, scanners and digital cameras. The expert system is also expanded by various technologies, including but not limited to, inference processing and pattern recognition. Furthermore, new products are continuously developed and with each new product, new issues arise, hence it is crucial to have the ability to continuously increase the expert system library's knowledge. In some embodiments, data is collected utilizing different types of available agents including sensor agents, which monitor things like network traffic and temperature and performance of hardware. This collected data is also sent to the expert system library.

The discrete programs execute desired tasks and are able to remediate certain issues. For example, the function ethernet_counter determines if an ethernet cable is functioning correctly. If ethernet_counter returns values that increase over time, then the cable is likely not performing well and should be replaced. For such an issue, a user must manually replace the cable. However, if there is a software problem such as a conflict between device drivers, a program is able to automatically update the drivers to avoid the conflict if that is the proper remedy.

Agent software installed on an end user's system is resident and thereby able to interrogate the user's system for hardware and software configurations. The information obtained by the interrogation is used in conjunction with the expert system library to ascertain whether there are problems on an end-user's system. The expert system library describes individual prerequisites such as software versions, registry values and hardware and software configurations which are invalid or problematic. The agent application then uses the information to interrogate the client system for the existence of these problems. The discrete programs run in the background while monitoring the computing system. When an issue arises, the programs are executed in a specified order to analyze a particular aspect of the computing device. Generally, a program first determines the setup, then gathers system information such as licenses, software running and hardware configurations and then finally the system is analyzed. Analysis includes determining any problems and addressing them as deemed appropriate using scripts and programs. Furthermore, issues are assigned a severity or a priority so that high priority items are dealt with quickly. Additionally, there are health risks assigned to ensure the most important issues are corrected before any harm is done. For example, if there is a problem with a user's hard drive, that would be considered a high priority and also a high health risk because data might be written incorrectly resulting in data loss. However, if there is a problem with an ethernet cable dropping some packets, the priority is still high because a user desires a fast connection to the network, but the health risk is low since the only harm is that the user's access to the network is slower.

The agent software has many different functions, allowing it to accomplish a variety of tasks. The agent software is able to report issues that are found, making it a reporting engine, an inventory system, a security system and a performance manager. The agent software uses a language engine for performing the analysis. Although very complex tasks are being performed at times, the resultant script language is simplified for easy modification and interoperability. An interface environment uses the built in functions of the software to simplify what the user views. The interface environment, also referred to as the data entry screen, prompts the user for information. Simple and easily understood scripts are coupled to the interface environment. Then, beneath the scripting language is a more complex language which performs the underlying tasks necessary to remedy whatever situation exists. The scripts are generally less complex than the underlying programs to provide simplicity of interaction with the user interface. The underlying programs are necessary to interact with the system's hardware and software, thus need to have the specific abilities to accomplish such tasks. The scripts take the information from the programs and return a condition status. In some embodiments, the condition status is a binary-type value such as "true" or "false," "1" or "0" or a similar value. In other embodiments, the condition status is a string, ASCII value or other value representing status.

For example, if a user is having trouble viewing a web page on the Internet, the diagnostic and report system will analyze the situation. There are many possible causes of this problem such as the web site being temporarily down or the user's internet connection not functioning properly. The diagnostic and report system attempts to determine the root cause of the problem. A script initially asks if the host is available. The script uses the well known ping program or a program similar to the ping program to contact the host. Although the ping program returns data including the number of packets sent, received, lost, in addition to the round-trip time for the packets, that information is able to be consolidated into a binary form of an answer by the script. In particular, if the packets lost is equal to the packets sent, then the host is not available. So a script would ask something such as "Is the host available?" There are two possible responses from the script, "yes" the host is available or "no" it is not. As such, the script returns a much simpler and user-friendly response. Depending on the response, it is determined what else is required to pinpoint the problem. As shown, the script is simple in that it contacts specific programs to analyze the system and based on those responses, returns a binary-type answer.

The expert system library is compartmentalized, so that each component is able to handle a specific task. An example of the diagnostic and report system in use is in the area of network analysis. There are a plethora of aspects of networking that could contribute to a user not being able to access the network. Furthermore, to check each aspect is a burdensome and slow process. However, with the diagnostic and report system, the specific tasks are already designated and are then checked in a specified order. The broadest issues are addressed first and gradually the focus is narrowed to the specific component that is causing the problem. For example, if there is a problem connecting to the network, the following set of queries are used to determine why there is the problem. Is there a network device? If there is a network device, is it configured properly? Is the net device driver installed? Is the IP stack active? Is the IP stack DNS configured? Is the IP DNS active? Is there a default gateway? Is the default gateway responding? Is the first node after the gateway responding? Is the Internet accessible? Is the connection dropping packets? Are the tuning parameters set on the IP stack? Are the parameters set on the NetBios stack? Thus, based on the results of these queries, the diagnostic and report system is able to identify where the problem is stemming from. As described above, the process of finding the answers to these questions is tedious and generally too complex for an average user, hence implementing the diagnostic and report system not only improves efficiency and provides security, but it also enables those who are not computer savvy to accomplish tasks they otherwise would not be able to.

Contained within the expert system library is information describing the resolution of problems. The descriptions range from simple to complex and are able to include a variety of data such as user instructions on problem resolution or scripts which automatically resolve the end-user configuration problem. Resolutions include, but are not limited to, removal/cleanup of software de-installations, removal of invalid configuration information, installation of patches and others.

The diagnostic and report system when used by a larger support organization is able to be an extremely valuable system to end users. Each time a customer reports a problem and the support organization corrects the problem within the software deployment, the correction procedure or script is added to the central expert system library. The feedback mechanism will continuously expand the expert system library and ensure each new software system is tested for a wider and more comprehensive group of problems and has solutions to resolve such problems. The expert system is also expanded by various technologies, including but not limited to, inference processing and pattern recognition. Once the expert system library has stored every possible problem, all customers of the support organization are able to potentially have their systems run securely with high stability.

FIG. 1 illustrates a block diagram representation of the main components of an embodiment of the diagnostic and report system 100. In an embodiment of the diagnostic and report system, an expert system library 102 stores information about software packages and hardware and software configurations 114 required to support the software packages. An agent application 104 is located on one or more user systems. The agent application 104 interrogates the user system 106 for hardware and application configurations. Using the information obtained from the interrogations, the agent application 104 is able to determine if there are any problems. If there are any problems, then the agent application 104 reports the problem to the end-user and/or initiates a remediation script to repair the problem. Furthermore, the agent application 104 is able to receive automatic upgrades 112 so that it is able to continue protecting against improper installations and also automatically upgrade the user system 106. A feedback mechanism 116 sends any newly discovered problem information to the expert system library 102, so that the expert system library 102 is able to incorporate such a problem and will be able to detect and resolve it in the future. The expert system library 102 is able to continuously grow so that it is able to detect more and more issues as time passes. All of the components of the embodiment of the diagnostic and report system function to assist a user in detecting conditions that will potentially corrupt the user system 106 and then grow the expert system library 102 when new issues are discovered, so that they will be detected in other systems in the future.

Figure 2:
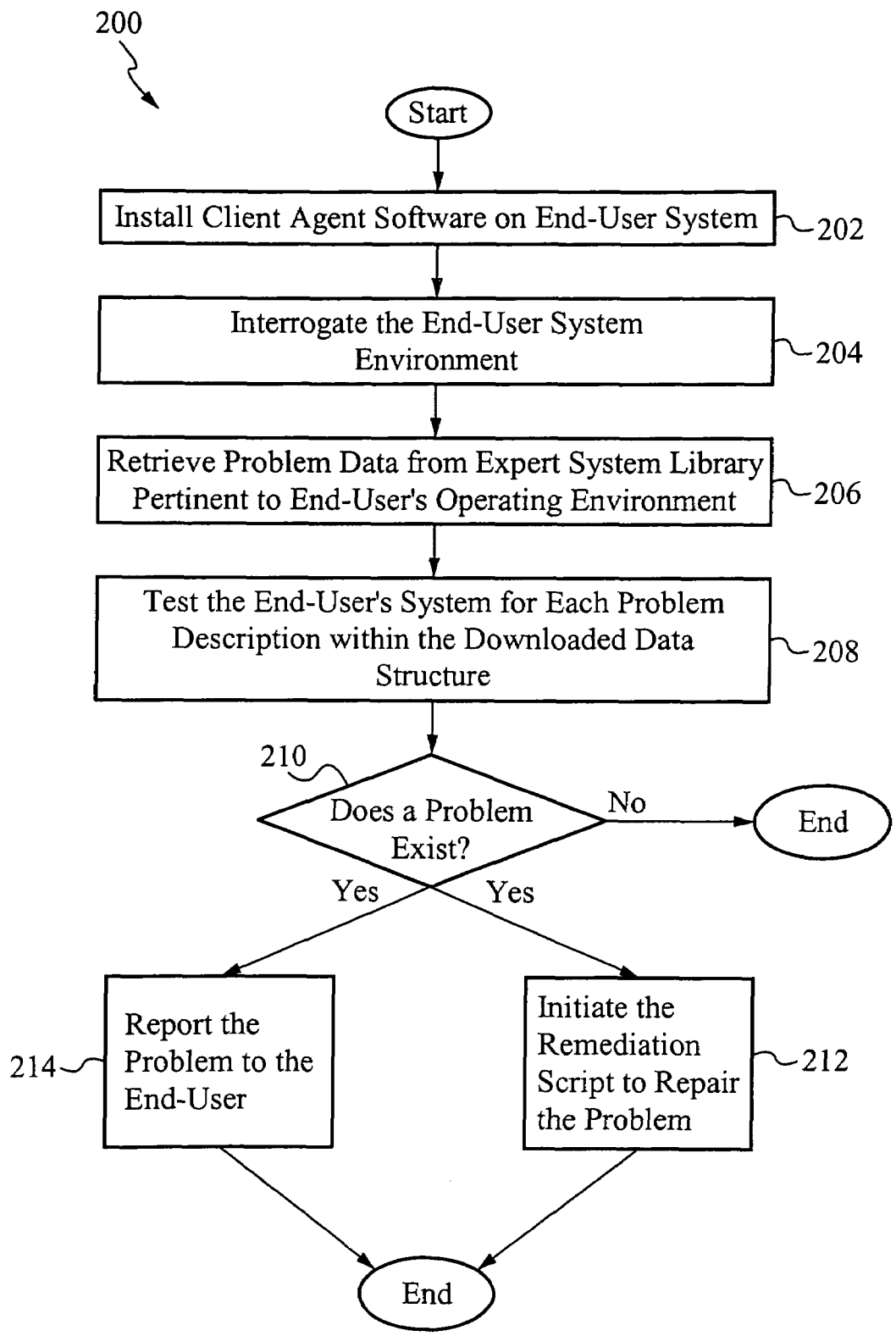
FIG. 2 illustrates a flowchart of the agent application determining if there are any problems.

FIG. 2 illustrates a flowchart of the agent application determining whether there is a problem that needs to be remedied 200. At the step 202, the agent application is installed on the end-user's system. The agent application is able to come pre-installed on a user's system or a user is able to download the agent application as needed. At the step 204, the agent application interrogates the end-user system for the basic environment. At the step 206, the agent application retrieves problem data from the expert system library pertinent to the end-user's operating environment. For example, if the operating environment is Windows® NT, then problem data related to Windows® NT is retrieved. At the step 208, the agent application tests the end-user's system for each problem description within the downloaded data structure. At the step 210, the agent application determines if any of the problems are detected. If the end-user system does have problems, then the agent application either reports the problems to the end-user at the step 214 and/or initiates the remediation script to repair the problem at the step 212.

There are a wide range of problem conditions that the end-user system is able to detect in the step 210. The following are examples of problem conditions tested by the agent application; however, they are not meant to limit the invention in any way. Software is tested for problems such as problematic software patch revisions, incompatible software packages, problematic software installations and problematic software package un/de-installations. The operating system is also checked, such as Windows® registry corruption and existing performance issues. Environmental issues are investigated such as low disk space or hardware errors. Network issues are checked such as interface errors, DNS or IP configuration problematic, IP routing failure and ISP network performance. Other important elements of a secure system are investigated such as detecting viruses, driver problems and serious security vulnerabilities. Any issues that could create system instability are also able to be investigated.

FIG. 3 illustrates an example data structure for the expert system library. The expert system library transfers data structures to the agent so that the client is able to perform checks to determine if there are any problems. The preferred format for the data structures is an embedded language with XML wrapping, although any format is acceptable. The example data structure 300 has the following item definitions within it. An ID item 302 stores the test record number. A class item 304 holds the type of test to be performed, such as performance, software patch level, security, virus or software inconsistency. A platform item 306 stores the operating system environment information, for example Windows NT, ME or XP. A product item 308 contains the affected application's information. The product item 308 is a specific component that needs to be investigated such as the Windows Shell or a specified application. A description item 310 stores a detailed description of the problem described. A criteria item 312 holds the subroutine used to identify test criteria. Within the criteria item 312, a test_ref subroutine 313 is used to identify test criteria. Although only one test_ref subroutine 313 is shown in FIG. 3, the criteria item 312 is able to hold a number of test_ref subroutines 313 depending on what test criteria is needed. A remediation description item 314 contains instructions on how to repair the problem described, and a remediation script item 316 stores one or more scripts to automatically remediate the problem described.

FIG. 4 illustrates an example XML coded version of a data structure of the expert system library. In the example, the ID item is "5." The platform item is "Windows." Furthermore, the category is "hardware" and the family is "Hardware Management." Hence, the agent application knows that it needs to investigate issues concerning hardware management of Windows®. Additional items are able to be included in the data structure as well such as a dependency, confidence and health index. The date_created and date_modified items are useful in determining when the data structure was created or modified which helps in the process of problem solving. The description item describes the problem, which in this example, is that the "ethernet card is reporting errors." Diagnostic script language is included to determine the status of the hardware or software. Remediation information is used to help resolve the problem, such as a suggestion to "replace your ethernet cable." If proper, a remediation script is included to automatically correct the problem. As described above, in the example, the data structure comprises the items required to perform system checks to aid in determining potential conflicts on a user's system. The aforementioned example is not meant to limit the diagnostic and report system in any way.

The agent application is host-based software, pre-installed on an end user system. The application is an interpreter for the data structure downloaded from the central expert system library and a library of functions. The functions primarily access information about a user's system or remediate a user's system. For example, one function is able to query an operating system to determine if it has a certain patch installed, and another function is able to install the patch. The agent application is also responsible for reporting problems found. Other functions of the agent application include, but are not limited to, accessing hardware error counts, reading/writing the Windows® registry, accessing software modules and version/patch levels, moving, copying and removing files from the file system, reading operating system environment such as memory and disk space, updating virtual memory configurations and many other functions to maintain a stable environment.

The expert system library utilizes a plug-in architecture. Each expert system library record has functionality of a discrete program such that each entry is able to be added to the expert system library without affecting the other expert system library entries and updated or removed from the expert system library with no effect on the other problem records. Such a plug-in architecture allows multiple authors to maintain different problem records independently of simultaneous work being done on other problem records.

The expert system library data structure includes procedural language elements including, but not limited to, boolean logic, string manipulation, flow control verbs and simple match functions. The language provides a system interpretation tightly integrated with the operating system. The language is used to create powerful and flexible mechanisms to test for the existence of problem conditions. For example the following language function tests the Windows® registry for the existence of a value:

```
str regvalue
str regkey
regkey =
   "\HKEY_LOCAL_MACHINE\SOFTWARE\Microsoft\
```

-continued

```
WindowsNT\CurrentVersion\Hotfix\Q312895"
regvalue = F$GETREG(regkey)
if (regvalue != "<error>") then
   return 9 //signal hotfix not installed
else
   return 0 //signal hotfix installed
endif
```

The example language checks if the HotFix (Patch) is installed by analyzing the value of the Windows® registry value at Q312895. If the value is not an error, then the Microsoft® patch is installed. Further, the routine is able to check for one or more code modules which are supposed to be updated by this patch. If the code module version is less than the correct value, then the registry has the patch recorded as installed, but the actual code module could be below the correct value, which would mean the patch was installed but the installation failed.

The language interpreter, part of the agent application, contains a set of functions which are called the Expert System Library Data Language. The functions are specific to operating environments, but operate the same for the Expert System Library Data Language. The operating environments where the functions reside could include Microsoft® Windows®, Microsoft® CE, Unix, Linux, handheld operating systems, cell phone operating systems as well as others. The function portability allows the diagnostic and report system to be implemented across many different platforms.

Since the functions are created in the specific operating system environment, the functions are able to reach into the operating system environments to retrieve specific and detailed data. Examples of such functions include, but are not limited to: Read Windows Registry Value, Check Device Error Counter Values, Check File System Organizations and Structures, Check File Modules and File Version Values, Check for Installation of Specific Applications, Read Environmental Values and Counters, Read Windows Event Log Entries as well as other functions to retrieve specific data.

Figure 5:
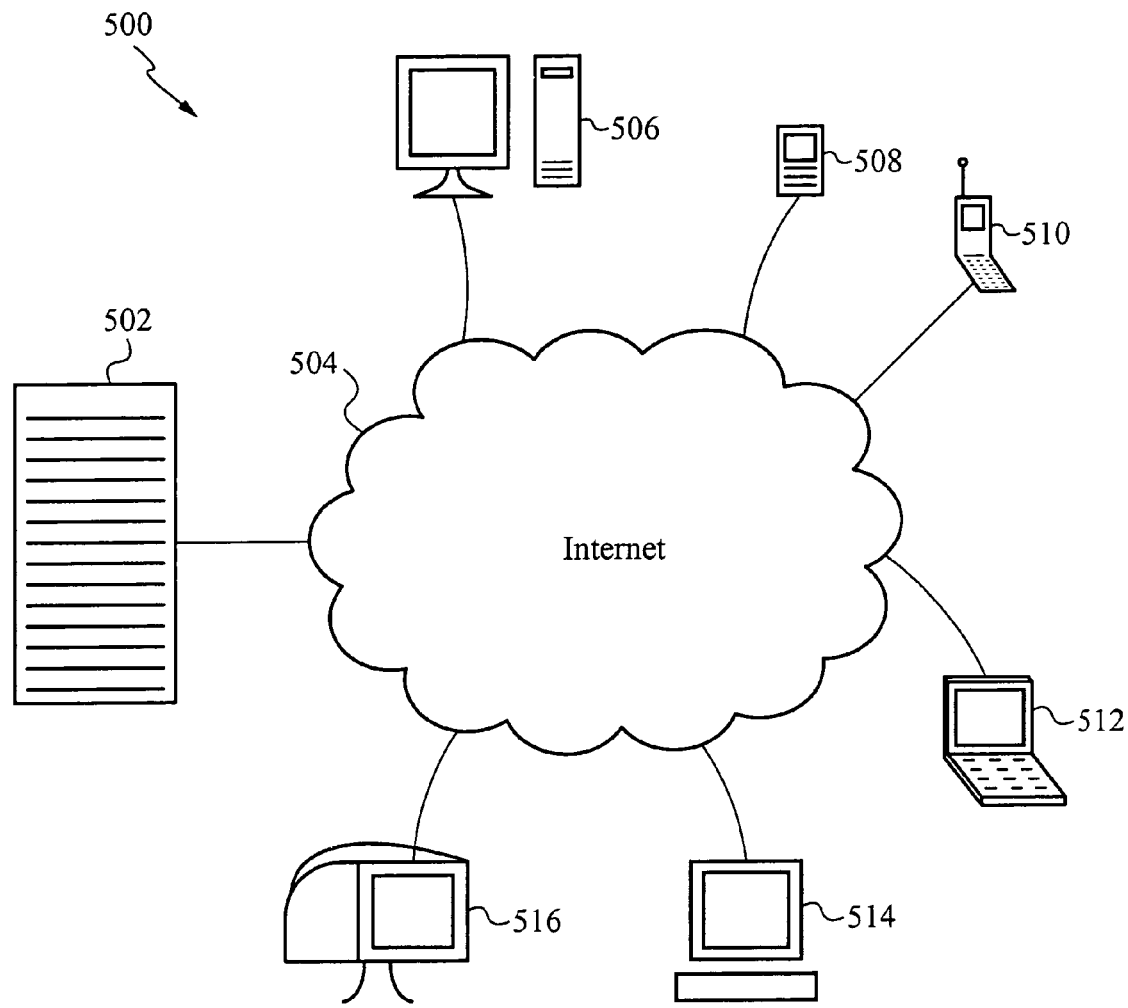
FIG. 5 illustrates a network implementing an embodiment of the diagnostic and report system.

FIG. 5 illustrates a network implementing an embodiment of the diagnostic and report system. The diagnostic and report system is implemented over a network of devices 500. The expert system library is stored on a server 502 that is coupled to the Internet 504 in an embodiment. In alternative embodiments, the server 502 is coupled to a company intranet or other types of networks such as a Local Area Network (LAN), Wide Area Network (WAN) or a Metropolitan Area Network (MAN). In yet other alternative embodiments, the expert system library is stored on one or more servers. Furthermore, the coupling between the server 502 and the Internet 504 is able to be via networking cables or wireless means. The Internet 504 is also coupled to a variety of computing devices that have the agent application stored on them. The computing devices include, but are not limited to, a personal computer 506, a PDA 508, a cell phone 510, a laptop computer 512, a thin client 514 or an Apple personal computer 516. The agent application retrieves problem data from the expert system library on the server 502. Then, the agent application on the computing devices checks to determine if there are any problems in the system. If any problems are discovered, the agent application alerts the user and/or attempts to remediate the issue using a script. If an unknown problem occurs without being detected, the reporting mechanism sends feedback to the server 502, so that the expert system library is able to learn of the issue and is able to detect such a conflict in the future. Thus, users of the system are able to feel comfortable they are working on a safe and secure environment and when there are undiscovered issues, with a large network of people, these undiscovered issues will be noticed and recorded so that other users' systems are able to resolve such issues.

Figure 6:
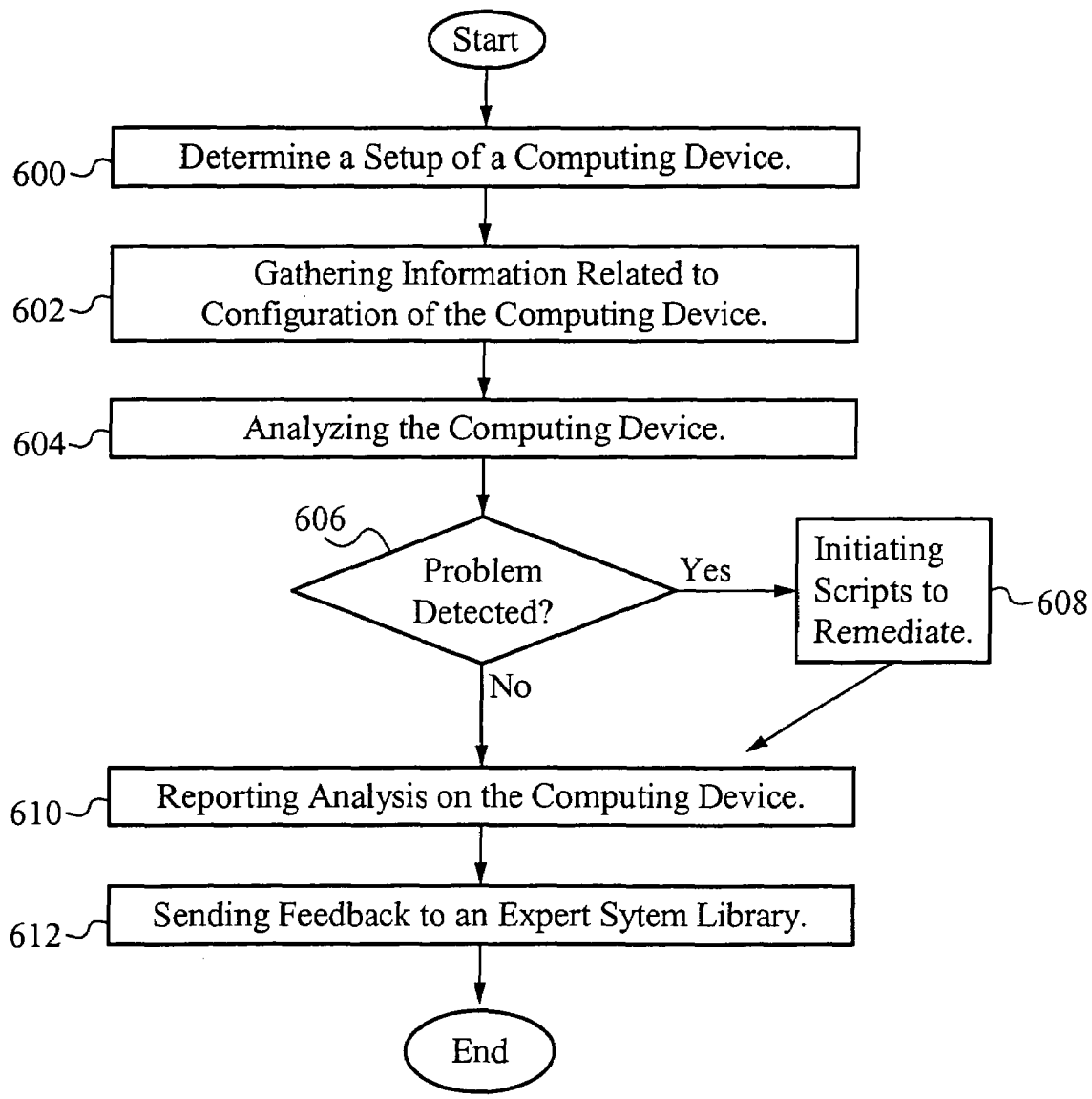
FIG. 6 illustrates a flowchart of utilizing the diagnostic and report system to maintain a stable computing device.

FIG. 6 illustrates a flowchart of utilizing the diagnostic and report system to maintain a stable computing device. In the step 600, a setup of the computing device is determined by the plurality of discrete programs. Setup information includes operating system information and hardware of the computing device. Then the discrete programs gather information related to configuration of the computing device, such as software installations, hardware connections and other configuration information in the step 602. Using the gathered information, the discrete programs are then able to analyze the computing device in the step 604. When analyzing the computing device the discrete programs monitor the system to make sure proper patches are installed, no software conflicts exist, the environment is stable and other necessary components are reviewed. If a problem is detected in the step 606, appropriate scripts are initiated to remediate the problem in the step 608. After the problem is remediated or if there is no problem, in some embodiments, the analysis performed by the discrete programs is reported on the computing device in the step 610. The reporting allows a user to review the status of the computing device and if any problems were discovered and how they were remediated. Also, in some embodiments, if a problem is discovered but is not able to be remediated, then feedback is sent to an expert system library in the step 612, so that in the future, such issues are known and the appropriate action is able to be taken if these issues occur again. The process continuously repeats in the background of the computing device, so that the system is able to remain stable. It should be understood that only those components that are needed are utilized again. For example, if there is no modification to the computing device setup, that information is not reacquired nor is the configuration information if the configuration has not changed. Thus, the diagnostic and report system is able to monitor the system thoroughly yet efficiently.

In another embodiment, the diagnostic and report system also includes capabilities of autonomous agent technology. Autonomous agent technology utilizes artificial intelligence techniques to determine actions to take and achieve desired results. As described above, the diagnostic and report system includes discrete programs and scripts to perform tasks. The discrete programs and scripts are able to make decisions on their own utilizing logic and also learn without user intervention. Furthermore, the discrete programs and scripts are able to work together with other discrete programs and scripts and learn from each other. The diagnostic and report system also includes a knowledge base which is able to learn and grow based on information obtained from the discrete programs and scripts. The knowledge base is able to generate new discrete programs and scripts based on what the discrete programs and scripts encounter and learn. For example, if a discrete program or a script encounters an issue that is unresolvable based on the existing discrete programs and scripts available in the expert system library, a new discrete program or script is able to be automatically developed by the knowledge base according to the issue confronted and the other existing discrete programs and scripts.

For example, a computer repeatedly shuts down, and the discrete programs and scripts determine that the video card is the cause, but cannot determine the specific reason because the exact issue is not included in a discrete program or script yet. The knowledge base is able to generate a new discrete program and/or a script based on known discrete programs and scripts, such as a discrete program for checking the temperature of a CPU. In this example, the reason for the computer shutting down was that the processor on the video card kept overheating. By utilizing knowledge of the discrete programs for the CPU and the data acquired for the system, a discrete program and/or script is able to be automatically developed by the knowledge base to test the temperature of the processor on the video card. For instance, the fact that the computer shuts down indicates a severe problem; therefore, the knowledge base is able to use that information to determine what type of discrete program and/or script to generate. Since this is somewhat of a trial and error process, because there is no guarantee that the discrete program and/script generated will solve the issues, additional discrete programs and/or scripts may also be generated. However, these new discrete programs and/or scripts will also be available in the future, in case there is another issue that would not have been able to be detected.

Specifically, as the discrete programs are running, they feed back information to the knowledge base which is able to use the information gathered to determine if additional discrete programs and/or scripts are to be developed. After performing analysis on the information, new discrete programs and/or scripts are generated by the knowledge base based off of standard program or agent models or templates. Once the new discrete programs and/or scripts are generated, they are sent to the expert system library for later use. This allows the library to grow and resolve more issues. The discrete programs and/or scripts work together, in conjunction with the knowledge base to develop and learn. Furthermore, the knowledge base continuously grows as data is collected so that additional discrete programs and/or scripts are able to be generated. An Integrated Development Environment (IDE) allows manual development of discrete programs and/or scripts as well.

Policies are also able to be generated where each policy is a small database with a set of rules. For example, for systems running Oracle, if there are any intrusions then the intrusions are shut down immediately. Policies are able to be incorporated in the agent software and enforced using the discrete programs and scripts.

Figure 7:
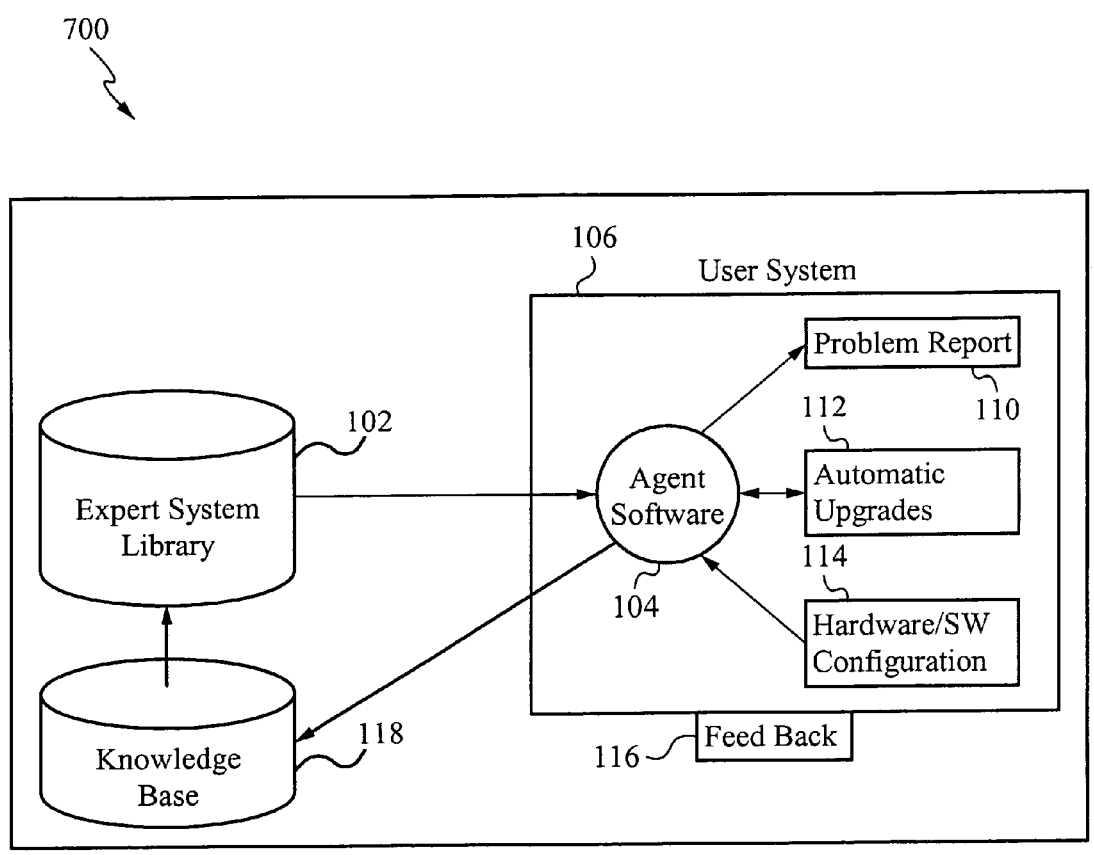
FIG. 7 illustrates a block diagram representation of the main components of an embodiment of the diagnostic and report system.

FIG. 7 illustrates a block diagram representation of the main components of an embodiment of the diagnostic and report system 700. An expert system library 102 stores information about software packages and hardware and software configurations 114 required to support the software packages. An agent application 104 with access to discrete programs and scripts is located on one or more user systems or servers. The agent application 104 interrogates the user system 106 for hardware and application configurations using the discrete programs and scripts. Using the information obtained from the interrogations, the agent application 104 is able to determine if there are any problems. If there are any problems, then the agent application 104 reports the problem to the end-user and/or initiates a remediation script to repair the problem. Furthermore, the agent application 104 is able to receive automatic upgrades 112 so that it is able to continue protecting against improper installations and also automatically upgrade the user system 106. A feedback mechanism 116 sends any newly discovered problem information to a knowledge base 118. Any other useful information is also sent to the knowledge base 118 via the feedback mechanism 116. The knowledge base 118 is able to learn and grow based on information received from the discrete programs via the feedback mechanism 116. In some embodiments, the discrete programs and scripts are able to communicate with the knowledge base 118 without the feedback mechanism 116. The knowledge base 118 is able to generate new discrete programs and scripts based on what the discrete programs and scripts encounter and learn. The knowledge base 118 contains models, agents, templates and any other mechanisms that enable the knowledge base 118 to be artificially intelligent such that it is able to develop new discrete programs and scripts. The knowledge base 118 then sends the new discrete programs and scripts to the expert system library 102 to be used to detect and resolve new issues in the future. The expert system library 102 is able to continuously grow so that it is able to detect more and more issues as time passes.

Figure 8:
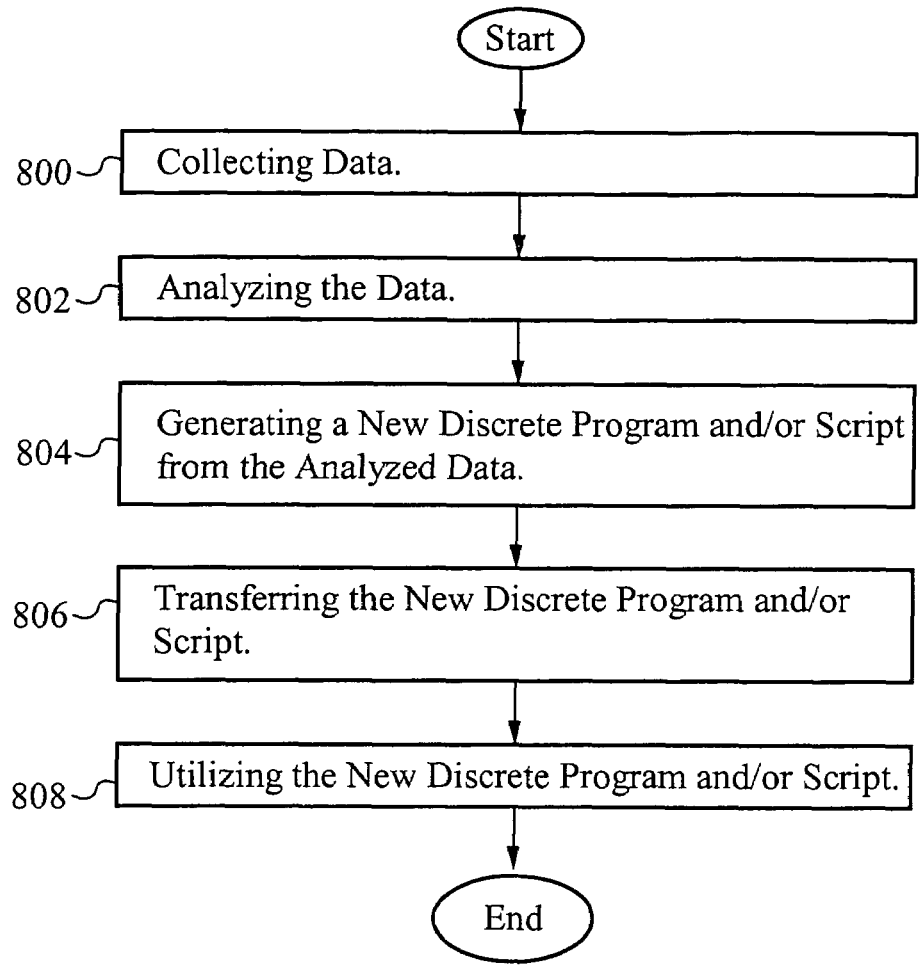
FIG. 8 illustrates a flowchart of a process of utilizing the diagnostic and report system to provide an increasingly secure and stable computing environment.

FIG. 8 illustrates a flowchart of a process of utilizing the diagnostic and report system to provide an increasingly secure and stable computing environment. In the step 800, data is collected. Preferably, the data is collected by discrete programs and/or scripts which are running within a system such as a user's computer, a server or a network. The process of collecting the data includes, if necessary, transferring the data to a knowledge base. In the step 802, the knowledge base analyzes the data. The knowledge base analyzes the data to determine if additional discrete programs and/or scripts should be generated and what capabilities the discrete programs and/or scripts should include. In the step 804, a new discrete program and/or script is generated from the analyzed data. The new discrete program and/or script contains characteristics based on the analyzed data. Specifically, the characteristics are those to monitor and/or resolve a specific issue. Furthermore, the new discrete program and/or script is generated using models, agents, templates and other mechanisms. In the step 806, the new discrete program and/or script is transferred. Preferably, the new discrete program and/or script is transferred to an expert system library. From the expert system library, the new discrete program and/or script is able to be utilized as needed, in the step 808. Agent software uses the additional discrete programs and/or scripts stored within the expert system library that are generated by the knowledge base. As a system utilizes more and more discrete programs and scripts, the system's stability should increase.

The discrete programs/scripts and additional discrete programs/scripts which are developed utilizing autonomous agent technology are comparable to antibodies in a human. If a human has a set of antibodies for disease A, then if disease A is introduced into the body, the antibodies are able to rid the body of that disease. However, if disease B is introduced, the body must adapt and develop new antibodies to remove disease B. The more antibodies the body has, the more diseases can be removed. Similarly, if a computing system has a set of discrete programs and/or scripts to handle issue A, then if that issue arises, it is taken care of. However, issue B requires the computing system to adapt to remedy the situation. Adaptation includes utilizing discrete programs and/or scripts that relate to the issue to generate a new discrete program and/or script which is specifically able to handle issue B. Additionally, if one discrete program and/or script is not capable of resolving an issue, possibly several discrete programs and/or scripts are capable, and the issue is able to be resolved in that manner. Furthermore, as more and more discrete programs and scripts are generated, more and more issues will be able to be resolved.

In some embodiments, both discrete programs and scripts are stored within the expert system library. In some embodiments, only discrete programs are stored within the expert system library, and in some embodiments, only script are stored within the expert system library.

The diagnostic and report system supports subscription licenses, so that when the subscription is void or expired, the desktop software will be disabled and inactive. With respect to subscriptions, the diagnostic and report system has interfaces for billing support.

An additional feature of the diagnostic and report system includes offline operation. The software has the ability to run disconnected form the central server and network. The drawback with offline operation is that a user must install some if not all of the expert system library, so that it is able to be utilized locally. Furthermore, if an issue arises, the feedback mechanism is not able to communicate with the expert system library, thus the expert system library will be limited in its growth capabilities.

To utilize the diagnostic and report system, an end user computer has the agent application pre-installed. In an alternative embodiment, a user has to install the agent application after either downloading it or via CD. Once the agent application exists on the user's computer, it interrogates the user system for the basic environment. The agent application then retrieves problem data from the expert system library pertinent to the user's operating environment. The agent application tests the user's system for each problem description within the downloaded data structure from the expert system library. If a problem is discovered, then a script will attempt to remediate the problem and/or a notification will be sent to the user describing the issue such as "patch X is missing, go to www.findpatch.com to download and install the patch." If a problem unknown to the expert system library arises, a feedback mechanism sends information to a knowledge base which is able to utilize artificial intelligence to generate a new discrete program and/or script to resolve the problem. The new discrete program and/or script is transferred to the expert system library and is then utilized on the computing device. The new discrete program and/or script is generated using models, agents, templates and other mechanisms. In the preferred embodiment, the feedback is automatically sent. Additionally, other system information is sent to the knowledge base to be used to preemptively generate new discrete programs. The new discrete programs and/or scripts are then utilized by the expert system library to increase the total knowledge. Thus, the system is better protected. Furthermore, when another user with a similar or the same setup is tested, the agent application using the discrete programs and/or scripts will recognize the issue and will take the appropriate actions to handle it. In time, the number of problems able to be detected and resolved will increase, thus creating a more secure and stable environment.

In operation, the diagnostic and report system assists users in detecting potential problems and conflicts that a typical user is unaware of. Other programs attempt to detect specific problems, but they are insufficient to ensure an overall stable environment. The diagnostic and report system not only checks for software conflicts; it also checks for conflicts within the operating system for hardware conflicts as well. When a conflict or problem does arise, the diagnostic and report system utilizes scripts to attempt to resolve the problem and further reports these conflicts to the user. Furthermore, the agent application which monitors a user's computer is coupled to a feedback mechanism which is able to send data to a knowledge base which generates new discrete programs and/or scripts for resolving issues and then transfers the programs to the expert system library which is able to learn and expand to handle new potential conflicts. Since the expert system library is continuously expanding with new knowledge, once a new problem is discovered, the agent application is able to aid future users to resolve the problem. The expert system is also expanded by various technologies, including but not limited to, inference processing and pattern recognition. Ultimately, the diagnostic and report system could potentially continue to gain knowledge to the point where most, if not all, conflicts and problems have been discovered and will be resolvable before any detriment comes to the user's system.

Within the present application, software includes programs, applications, scripts, system software, middleware in addition to any other generally known meaning of software.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for monitoring a computing device comprising:
   a. a server device in communication with the computing device, the server device including a memory device comprising an expert system library;
   b. a plurality of programs for interacting with the computing device to gather information, wherein the plurality of programs are stored within the expert system library, wherein the plurality of programs run in the background of the computing device;
   c. a knowledge base element coupled to the plurality of programs, wherein the knowledge base element is configured to receive the information and to generate a new program configured to interact with the computing device, wherein the new program and one or more subsequent new programs are generated based on the information gathered from the computing device, and wherein the new program is configured to test the computing device for a configuration defect and to provide a remediation solution to one or more discovered configuration defects; and
   d. a feedback mechanism for sending feedback to the knowledge base element, wherein the knowledge base element expands the expert system library.

2. The system as claimed in claim 1 wherein interacting with the computing device further comprises:
   a. determining a setup of the computing device;
   b. gathering information related to configuration of the computing device; and
   c. analyzing the computing device.

3. The system as claimed in claim 2 wherein gathering information comprises discovering one or more problems.

4. The system as claimed in claim 1 wherein interacting with the computing device further comprises resolving an issue within the computing device.

5. The system as claimed in claim 1 wherein the expert system library is expanded by one or more of inference processing and pattern recognition.

6. The system as claimed in claim 1 further comprising a reporting mechanism to report one or more problems.

7. The system as claimed in claim 1 wherein the plurality of programs are embedded within an extensible markup language (XML) structure.

8. The system as claimed in claim 1 wherein the computing device is selected from a group consisting of a personal computer, an Apple computer, a thin client, a laptop, a cell phone and a PDA.

9. The system as claimed in claim 1 further comprising a plurality of scripts for communicating with the plurality of programs.

10. The system as claimed in claim 9 wherein the knowledge base element is for generating additional scripts for interacting with the computing device.

11. The system as claimed in claim 1 wherein the new program is generated using a program model.

12. The system as claimed in claim 1 further comprising a sensor agent for monitoring hardware characteristics and sending information to the knowledge base element.

13. The system as claimed in claim 1 wherein the configuration defect comprises a hardware or software configuration problem.

14. A system for monitoring a computing device while running in the background of the computing device comprising:
   a. a server device in communication with the computing device, the server device including a memory device comprising an expert system library;
   b. a plurality of programs for
      i. determining a setup of the computing device;
      ii. gathering information related to configuration of the computing device; and
      iii. analyzing the computing device for one or more problems;
   c. a plurality of scripts coupled to the plurality of programs for initiating the plurality of programs, wherein the plurality of programs and the plurality of scripts are stored within the expert system library;
   d. a knowledge base element coupled to the plurality of programs, wherein the knowledge base element is configured to receive the information and to generate a new program and a script configured to interact with the computing device, wherein the new program and one or more subsequent new programs are generated based on the information gathered from the computing device, and wherein the new program is configured to test the computing device for a configuration defect and to provide a remediation solution to one or more discovered configuration defects; and
   e. a feedback mechanism for sending feedback to the knowledge base element, wherein the knowledge base element expands the expert system library.

15. The system as claimed in claim 14 wherein the expert system library is expanded by one or more of inference processing and pattern recognition.

16. The system as claimed in claim 14 further comprising a reporting mechanism to report the one or more problems.

17. The system as claimed in claim 14 wherein the plurality of programs and the plurality of scripts are embedded within an extensible markup language (XML) structure.

18. The system as claimed in claim 14 wherein the computing device is selected from a group consisting of a personal computer, an Apple computer, a thin client, a laptop, a cell phone and a PDA.

19. The system as claimed in claim 14 wherein the new program and script are generated using a program model.

20. The system as claimed in claim 14 further comprising a sensor agent monitoring hardware characteristics and sending information to the knowledge base element.

21. The system as claimed in claim 14 wherein the configuration defect comprises a hardware or software configuration problem.

22. A system for monitoring a computing device comprising:
   a. a server device in communication with the computing device, the server device including a memory device comprising an expert system library;

b. a plurality of programs for interacting with the computing device to gather information, wherein the plurality of programs are stored within the expert system library, wherein the interacting comprises detecting a problem on the computer device and assigning a priority level to the problem, wherein the plurality of programs run in the background of the computing device;

c. a knowledge base element coupled to the plurality of programs, wherein the knowledge base element is configured to receive the information and to generate a new program configured to interact with the computing device, wherein the new program and one or more subsequent new programs are generated based on the information gathered from the computing device, and wherein the new program is configured to test the computing device for a configuration defect and to provide a remediation solution to one or more discovered configuration defects; and d. a feedback mechanism for sending feedback to the knowledge base element, wherein the knowledge base element expands the expert system library.

23. The system of claim 22 wherein the interacting further comprises assigning a health risk value to the problem based on future potential harm to the computing device if the problem is not corrected.

24. The system of claim 22 wherein the new program comprises a plurality of instructions that define how the new program will monitor for the configuration defect, resolve the one or more discovered configuration defects, or both.

25. The system of claim 22 wherein the programs run in the background of the computing device such that the programs are executed as a low priority process when one or more high priority processes are not accessing the resources of the computing device.

* * * * *